(12) United States Patent
Matthews et al.

(10) Patent No.: US 6,381,393 B1
(45) Date of Patent: Apr. 30, 2002

(54) FANNING STRIP FOR CABLE MANAGEMENT PANEL

(75) Inventors: Joel K. Matthews, Eden Prairie; Vern J. Loch, Prior Lake; Seth Morgan, Chanhassen; Christine N. Widness, Burnsville, all of MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/708,917

(22) Filed: Nov. 8, 2000

(51) Int. Cl.[7] .............................. G02B 7/00; H01R 9/22
(52) U.S. Cl. ....................... 385/134; 385/135; 439/719
(58) Field of Search ............................... 385/133, 134, 385/135; 439/719, 49, 540.1

(56) References Cited

U.S. PATENT DOCUMENTS

| | | | |
|---|---|---|---|
| 4,059,331 A | * 11/1977 | Sedlacek et al. | 439/719 |
| 4,618,194 A | * 10/1986 | Kwilos | 439/64 |
| 4,752,107 A | * 6/1988 | Gunell et al. | 439/709 |
| RE34,955 E | 5/1995 | Anton et al. | 385/53 |
| 6,009,223 A | * 12/1999 | Arizpe | 385/134 |
| 6,010,372 A | * 1/2000 | Ward | 439/712 |

OTHER PUBLICATIONS

ADC Telecommunications, Inc. drawings for an IFC connector module, 5 pages.

* cited by examiner

Primary Examiner—Neil Abrams
Assistant Examiner—Michael C. Zarroli
(74) Attorney, Agent, or Firm—Merchant & Gould P.C.

(57) ABSTRACT

A connector module includes a housing having a front panel for fiber optic terminations, and an interior. A front fanning strip manages the front cables. A rear fanning strip manages the rear cables within an interior of the housing. The front fanning strip includes flexible fingers including an arched portion, a linear portion, and an angled end. The rear fanning strip includes retainers with first and second cooperating fingers wherein the first finger is linear and includes a finger tab, and a blocking tab, and wherein the second finger is curved toward the first finger, and includes a blocking tab.

7 Claims, 6 Drawing Sheets

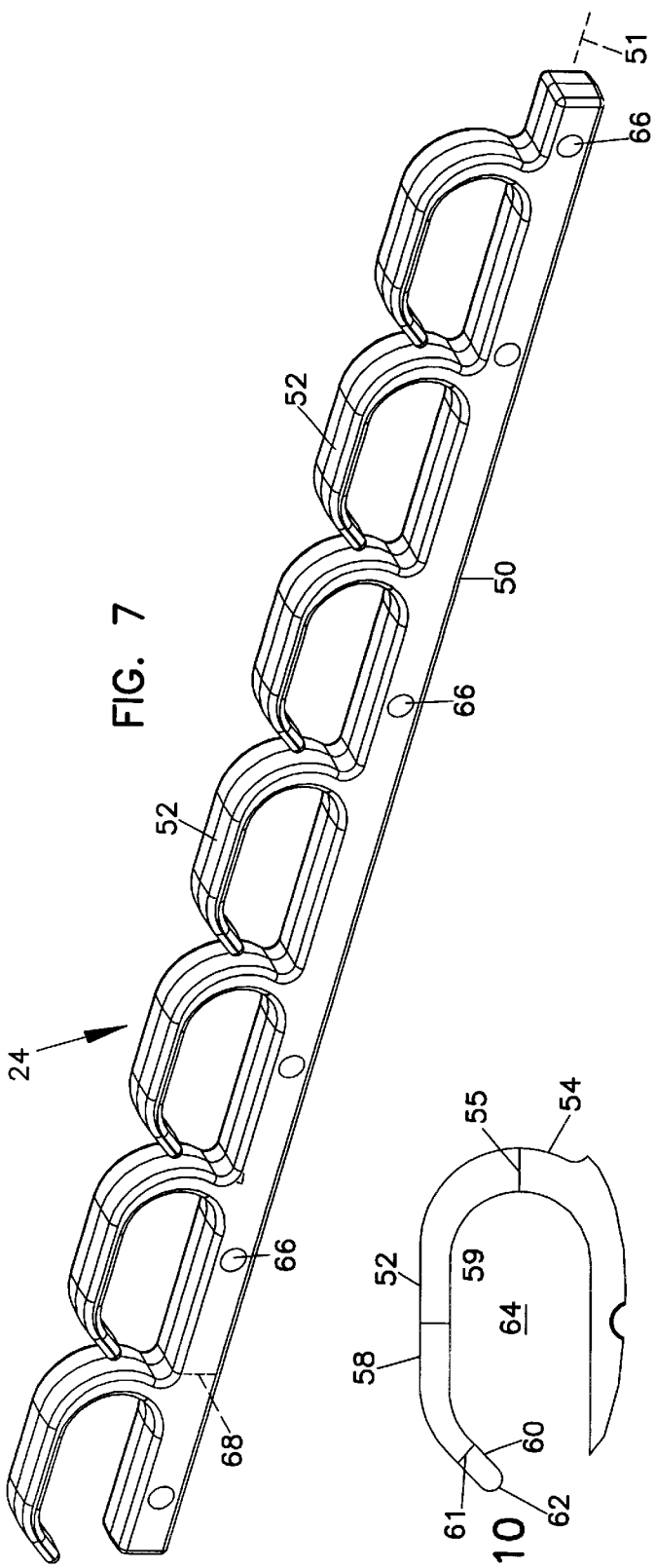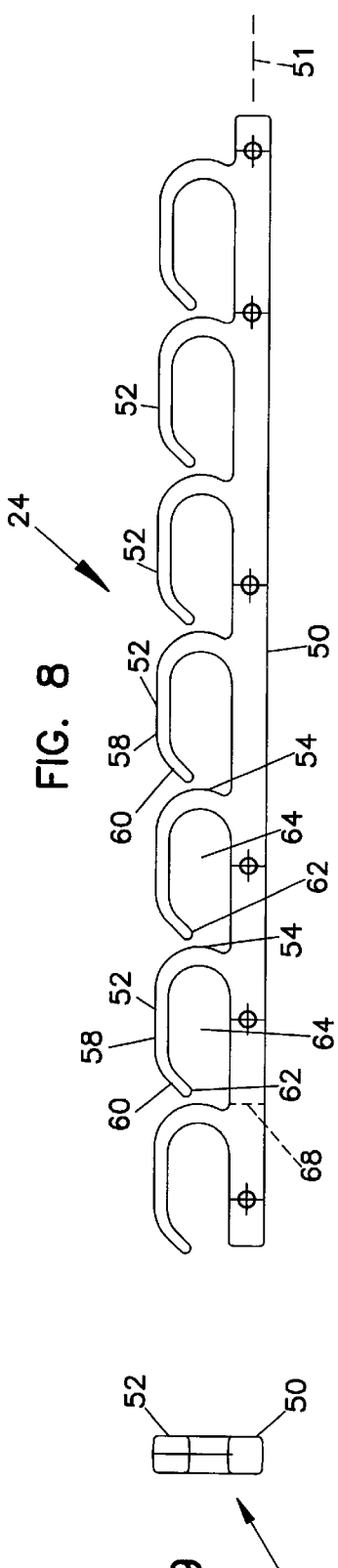

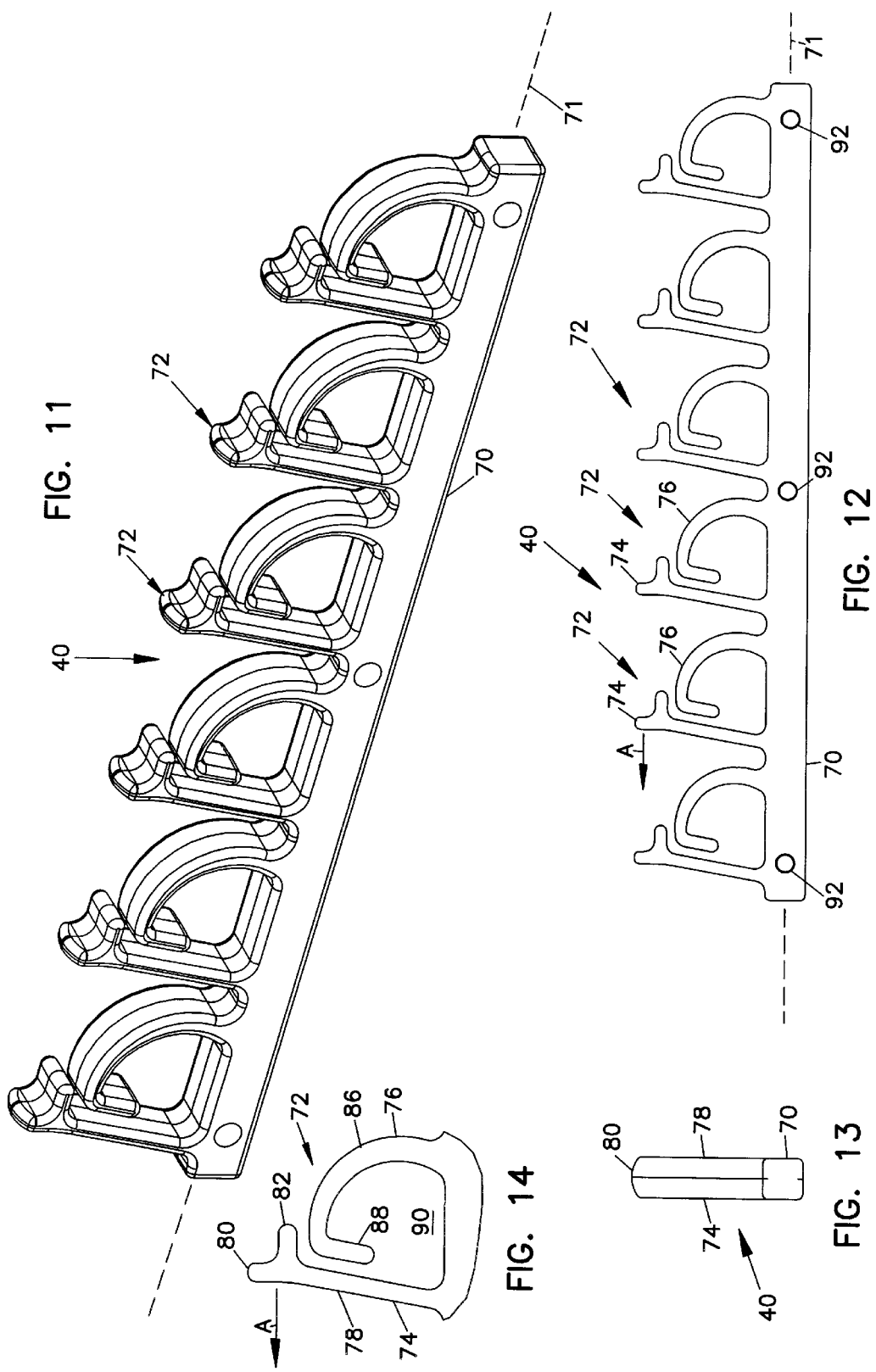

FANNING STRIP FOR CABLE MANAGEMENT PANEL

FIELD OF THE INVENTION

This application pertains to signal transmission systems with signals carried over optical fibers. More particularly, this invention pertains to cable management fanning strips and fiber distribution modules and frames.

BACKGROUND OF THE INVENTION

The increased use of optical fiber transmission in the telecommunications industry has resulted in a need for the development of optical fiber termination equipment. U.S. Pat. No. 4,995,688 concerns an optical fiber distribution frame for managing the optical fiber terminations and other equipment.

Notwithstanding prior design efforts, the optical fiber signal transmission industry is in continued need of new designs of optical fiber distribution and management equipment.

SUMMARY OF THE INVENTION

According to a preferred embodiment of the present invention, a cable management fanning strip is disclosed which includes a one-piece molded plastic body including an elongated base extending in a linear direction along a longitudinal axis, and a plurality of cable retainers extending from the base. The cable retainers hold fiber optic cables in an organized manner in and around fiber optic distribution and other equipment.

In a first preferred embodiment of a cable management fanning strip, each cable retainer includes a plurality of extending fingers. Each finger includes: an arched portion defining a first width; a linear portion extending from the ached portion extending parallel to the base, and defining a second width, the second width smaller than the first width; and an angled portion extending from the linear portion where the angled portion extends toward the base, with a tip positioned adjacent to the arched portion of an adjacent finger, and the angled portion defining a third width smaller than the second width.

In a second preferred embodiment of a cable management fanning strip, each cable retainer includes a first finger portion extending linearly from the base and terminating in a tip, each first finger portion including a blocking tab extending from the first finger portion at a spaced-apart distance from the base, and also spaced from the tip. Each retainer further includes a second finger portion having an arched portion extending from the base and extending toward the linear extension of the first finger portion. The second finger portion includes an inner projecting tab at an end of the arched portion positioned between the blocking tab and the base.

A further aspect of the present invention further relates to a connector module mountable to a rack or frame where the connector module includes a housing including a front panel defining a plurality of fiber optic terminations. Adjacent to the front panel are first and second front fanning strips on opposite sides of the panel for managing cables extending to a front side of the front panel. In one preferred embodiment of the connector module, the first preferred embodiment of the fanning strip is utilized for the front fanning strips. The connector module further includes an interior accessible through the rear of the housing. A fanning tree is provided in a central location of the interior of the housing for managing cables extending to a rear side of the front panel. In one preferred embodiment of the connector module, the second preferred embodiment of the fanning strip is utilized on the fanning tree. One embodiment of the fanning tree includes two fanning strips of the second preferred embodiment.

BRIEF DESCRIPTION OF THE DRAWINGS

FIG. 7 is a perspective view of one of the front fanning strips;

FIG. 8 is a side view of the front fanning strip;

FIG. 9 is an end view of the front fanning strip;

FIG. 10 is an enlarged view of a portion of the front fanning strip;

FIG. 11 is a perspective view of one of the rear fanning strips;

FIG. 12 is a side view of the rear fanning strip;

FIG. 13 is an end view of the rear fanning strip; and

FIG. 14 is an enlarged portion of the rear fanning strip.

DETAILED DESCRIPTION OF THE PREFERRED EMBODIMENTS

Figure 1:
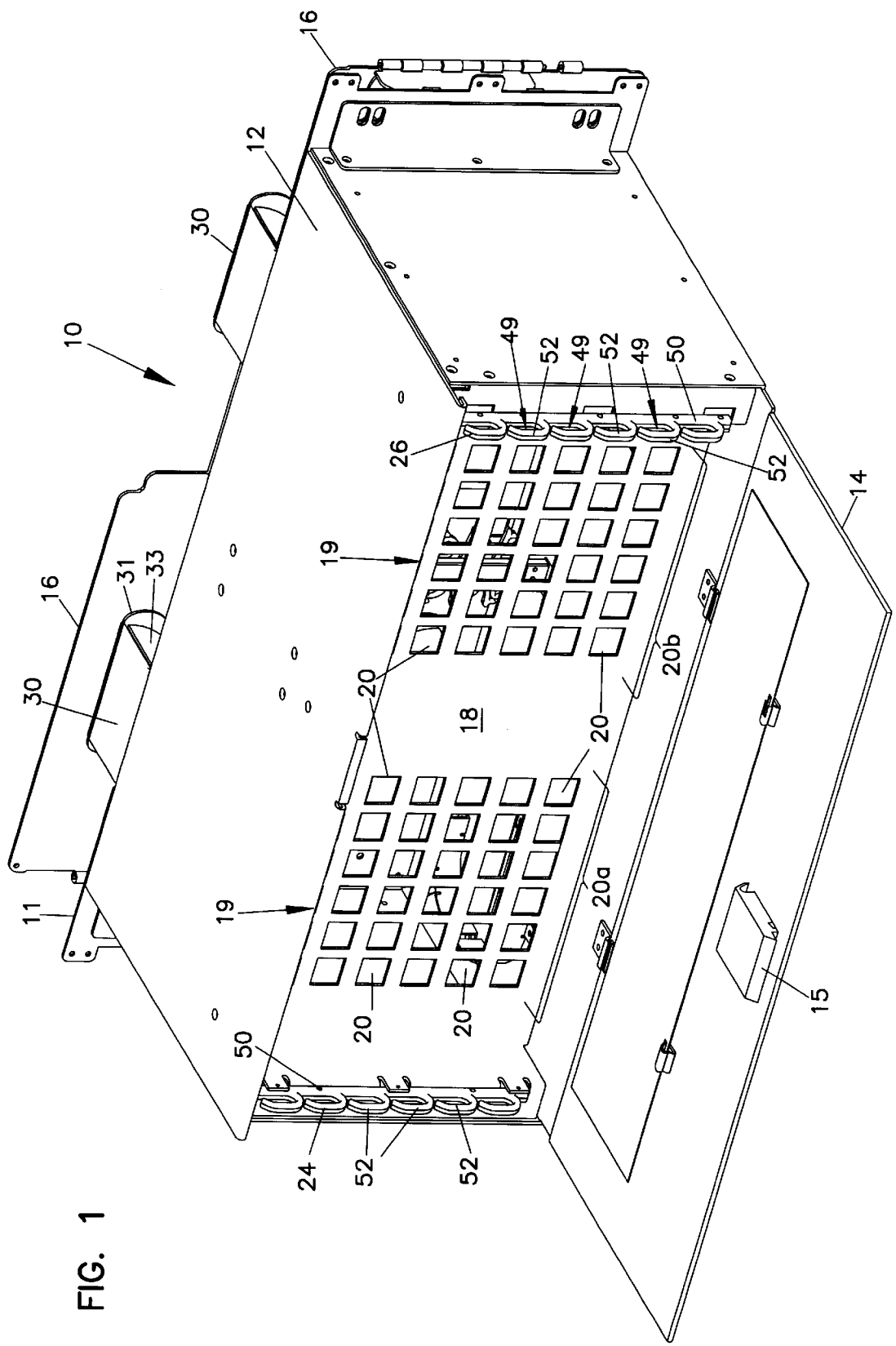
FIG. 1 is a perspective view of a connector module in accordance with one embodiment of the present invention with a front door pivoted open.
Figure 2:
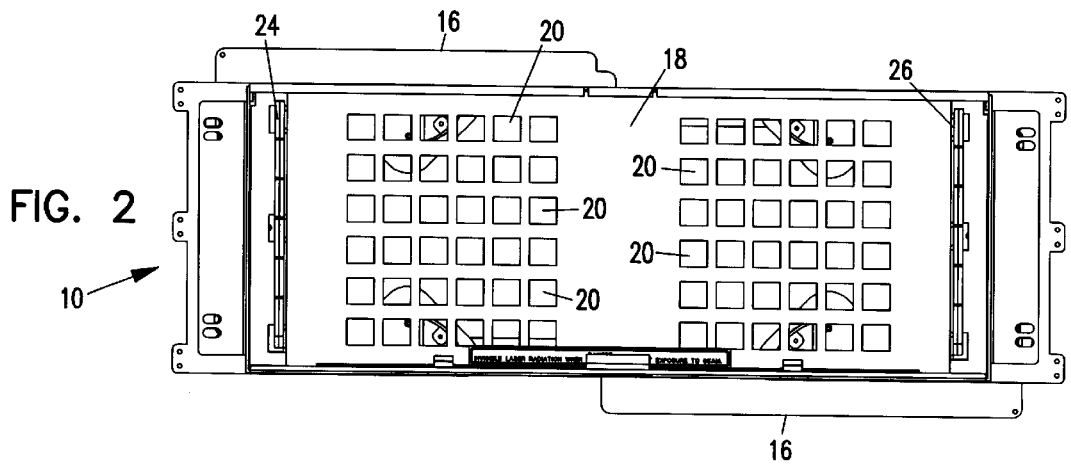
FIG. 2 is a front view of the connector module of FIG. 1.
Figure 3:
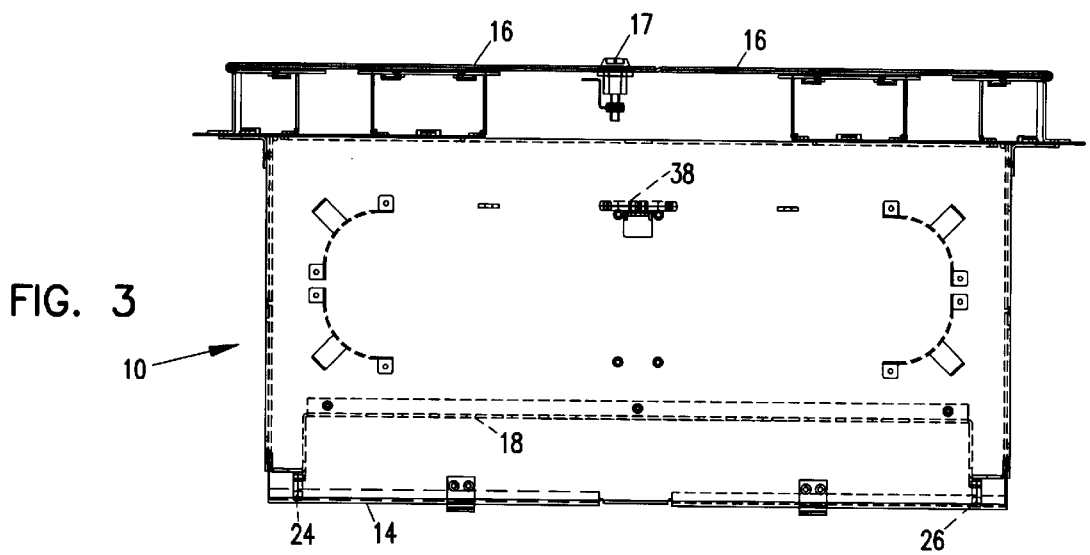
FIG. 3 is a top view of the connector module of FIG. 1, with interior portions shown in dashed lines.
Figure 4:
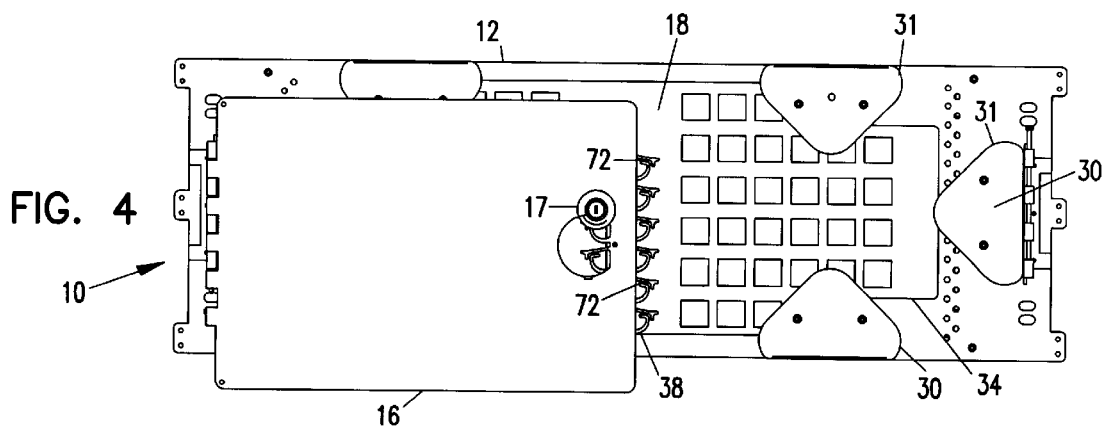
FIG. 4 is a rear view of the connector module of FIG. 1, with one of the rear doors removed.
Figure 5:
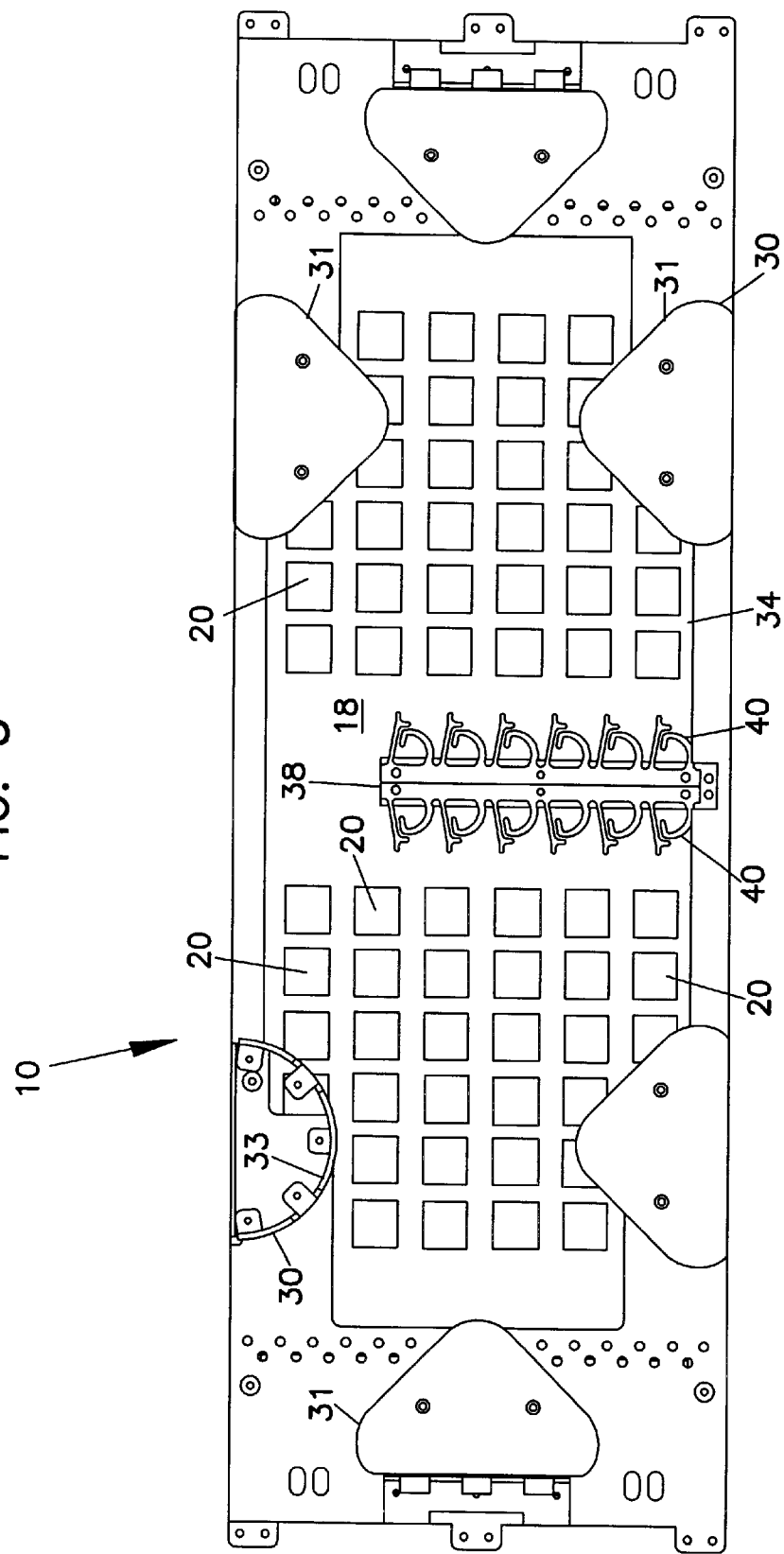
FIG. 5 is a rear view of the connector module of FIG. 1, with both rear doors removed, and with one of the rear cable guide plates removed.
Figure 6:
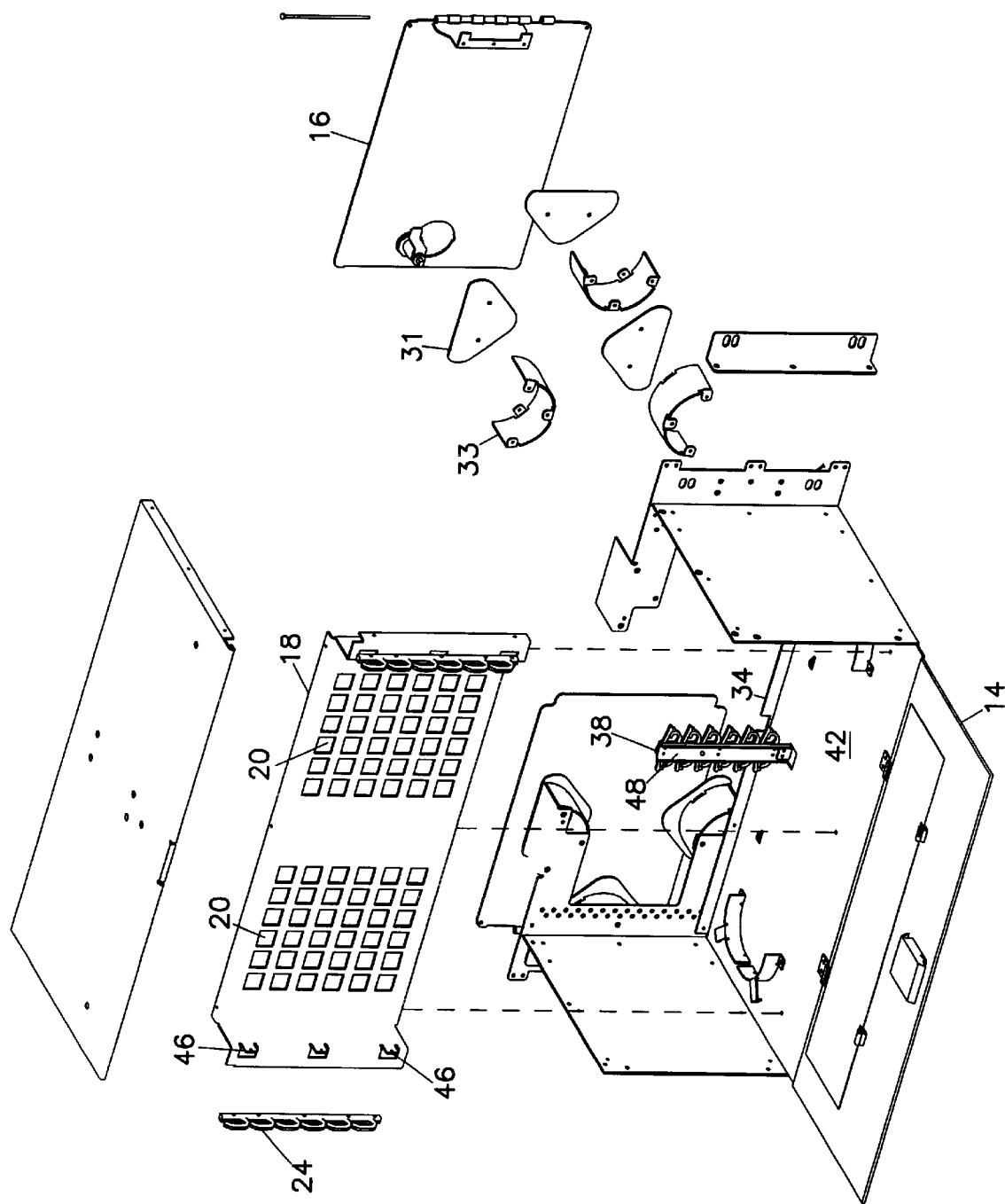
FIG. 6 is an exploded perspective view of the connector module of FIG. 1.

Referring now to the FIGS., a first preferred embodiment of a connector module 10 is shown. Connector module 10 is mountable at flanges 11 via fasteners to a rack or frame (not shown) along with additional similar modules 10 or other telecommunications equipment. Module 10 includes a housing 12 and a pivotally mounted front door 14. Front door 14 includes a latch 15. Behind front door 14 is a front panel 18 defining termination locations 19, for example, fiber optic adapters for connecting two fiber optic connectors, such as SC type. Pivotally mounted rear doors 16 allow selective access to an interior of housing 12 through a rear of housing 12. Rear doors 16 are latched to each other at a latch 17. In a typical telecommunications system, cables enter the rear of housing 12 for termination at front panel 18. Further cables, for example, patch cords, extend from the termination locations at the front of housing 12 to other termination locations or to other equipment.

Front panel 18 includes a plurality of openings 20 for receiving the fiber optic terminations. For example, openings 20 can receive the individual adapters, such as SC-type, where each adapter can receive a fiber optic connector on each end. Openings 20 are arranged in an array of horizontal rows and vertical columns of openings. In the example shown, left and right arrays 20a, 20b are shown.

Adjacent to the left and right sides of front panel 18 are front fanning strips 24, 26, respectively. Fanning strips 24, 26 include cable retainers 49 to manage the cables, for example, individual fibers, such as in patch cords, extending toward front panel 18.

At a rear of housing 12, rear cable routing guides 30 with guide plates 31 and radius limiters 33 are provided for managing cables extending to the rear of module 10. A rear panel 32 of housing 12 defines a rear opening 34 for the cables to enter an interior of housing 12. A fanning tree 38 holds the individual cables (fibers or bundles or fibers) in an organized manner before termination at front panel 18. Each fanning tree 38 includes two fanning strips 40 extending upwardly from a base 42 of housing 12. Each fanning strip 40 faces in opposite directions on tree 38. Each fanning strip 40 manages cables extending to the rear of front panel 18 with cable retainers 72.

Now with reference to FIGS. 7–10, front fanning strip 24 is shown in greater detail. Front fanning strip 26 is constructed in a similar manner. Front fanning strip 24 includes a linear base 50 defining a longitudinal axis 51 with a plurality of extending fingers 52 defining the cable retainers 49. Each finger 52 is flexible relative to base 50 to allow cables to be inserted or removed from between fingers 52 and base 50. Each finger 52 includes an arched portion 54, followed by a linear portion 58, followed by an angled portion 60 terminating in a tip 62. Tip 62 is positioned adjacent to arched portion 54 of an adjacent finger 52. Angled portion 60 is angled toward base 50. Linear portion 58 extends generally parallel to base 50. Arched portion 54 generally defines a radius extending from base 50.

In the preferred embodiment of fanning strip 24 shown, at a general mid-point of each of arched portion 54, linear portion 58, and angled portion 60 a width is defined which decreases as each finger 52 extends from base 50. Width 55 of arched portion 54 is greater than width 59 of linear portion 58, which is greater than width 61 of angled portion 60. Front fanning strip 24 is preferably made from a one-piece molded plastic, such as a thermoplastic elastomer. Holes 66 through base 50 permit fasteners to mount fanning strip 24 to brackets 46 of housing 12. Fanning strip 24 can be cut to the desired length from a longer length, such as along line 68. Preferably, there is one finger 52 for each row of termination locations on front panel 18.

In use, the front cables are retained by fingers 52 of strip 24. To insert the front cables, the operator first pushes one or more front cables laid transversely to base 50 adjacent to one of fingers 52. The front cables are pressed so as to push finger 52 inwardly toward base 50, wherein the one or more cables clear tip 62 and are placed in a retention chamber 64 defined by each finger 52 and base 50. To remove one or more cables from chamber 64, the cables and/or the linear portion 58 and angled portion 60 are pulled away from base 50 to thereby pull tip 62 clear of its position shown in FIGS. 7–10, thereby allowing removal of one or more cables from chamber 64.

Now with reference to FIGS. 11–14, rear fanning strip 40 is shown in greater detail. A linear base 70 defining a longitudinal axis 71 includes a plurality of cable retainers 72 where each cable retainer 72 includes a first finger portion 74 and a second finger portion 76. First finger potion 74 includes a linear extension 78 terminating in a tip 80. A blocking tab 82 extends in the direction of second finger portion 76 and at an angle to linear extension 78. Blocking tab 82 is further spaced from base 70 and an end of first finger portion 74 at tip 80. First finger portion 74 is flexible relative to base 70. Second finger portion 76 includes an arched portion 86 extending from base 70 and curving toward linear extension 78. Arched portion 86 terminates in an inner projecting linear tab 88 positioned between blocking tab 82 and base 70. In the illustrated embodiment, extension 78 is at an 80 degree angle relative to base 70, and extends downwardly in fanning tree 38. Arched portion 86 generally defines a radius extending from base 70.

First and second finger portions 74, 76 cooperate to define a cable retention chamber 90. Chamber 90 is accessible by moving tip 80 of first finger portion 74 away from second finger portion 76 in the direction of arrow A (see FIGS. 12 and 14).

Rear fanning strip 40 is preferably made from a one-piece molded plastic, such as a thermoplastic elastomer. Holes 92 mount fanning strip 40 via fasteners to an elongated member 48 extending upwardly from base 42 of housing 12. Fanning strip 40 can be cut to length from a longer strip, if desired. Preferably, there is one cable retainer 72 for each row of termination locations.

In use, the rear cables are retained in chamber 90 of each cable retainer 72. To insert one or more cables into chamber 90, the operator flexes first finger portion 74 in the direction of arrow A to expose a cable pathway between first finger portion 74 and second finger portion 76. Upon release of first finger portion 74, first finger portion 74 returns to the position shown in FIGS. 11–14, thereby retaining the cables in chamber 90. To then remove one or more cables, the user flexes first finger portion 74 in the direction of arrow A to expose a pathway for removal of one or more cables. Cable retainers 72 allow for one-handed operation by the operator to open the cable pathway for insertion or removal. In the connector module 10, each first finger portion 74 is lifted upwardly to expose a pathway for cable insertion or removal.

The above specification, examples and data provide a complete description of the manufacture and use of the invention. Since many embodiments of the invention can be made without departing from the spirit and scope of the invention, the invention resides in the claims hereinafter appended.

What is claimed is:

1. A cable management fanning strip comprising:
    a one-piece molded plastic body including:
        an elongated base extending in a linear direction defining a longitudinal axis;
        a plurality of cable retainers extending from the base, each cable retainer including:
            a first finger portion and a second finger portion;
            the first finger portion including a linear extension extending from the base, the linear extension terminating in a tip, the linear extension including a blocking tab spaced from an end of the tip, and extending at an angle from the linear extension;
            the second finger portion including an arched portion extending from the base and curving toward the linear extension, the arched portion terminating in an inner projecting tab extending toward the base, the inner projecting tab positioned between the blocking tab and the base.

2. A fiber optic connector module for connecting front cables to rear cables comprising:
    a housing including flanges for mounting the housing to a rack, the housing including a front panel defining a plurality of openings, each opening configured and arranged for receiving at least one fiber optic termination for connecting one of the front cables to one of the rear cables, the housing further including an interior, and a rear panel defining an opening for accessing the interior of the housing;
    a front fanning strip positioned adjacent to the front panel, the front fanning strip including a plurality of cable retainers for the front cables;

a rear fanning strip positioned within the interior of the housing, the rear fanning strip including:

an elongated base extending in a linear direction defining a longitudinal axis;

a plurality of cable retainers for the rear cables extending from the base, each cable retainer including:

a first plastic finger portion and a second finger portion;

the first finger portion including a linear extension extending from the base, the linear extension terminating in a tip, the linear extension including a blocking tab spaced from an end of the tip, and extending at an angle from the linear extension, the first finger portion bendable relative to the base;

the second finger portion including an arched portion extending from the base and curving toward the linear extension, the arched portion terminating in an inner projecting tab extending toward the base, the inner projecting tab positioned between the blocking tab and the base.

3. The connector module of claim 2, wherein the front fanning strip includes:

an elongated base extending in a linear direction defining a longitudinal axis;

a plurality of cable retainers extending from the base, each cable retainer including:

a plurality of plastic fingers, each finger including an arched portion, a linear portion, and an angled portion, wherein the arched portion defines a radius extending from the base, wherein the linear portion extends generally parallel to the base, and wherein the angled portion extends toward the base and terminates adjacent to an arched portion of an adjacent finger, each finger bendable relative to the base.

4. The connector module of claim 2, wherein the rear fanning strip is a front rear fanning strip, and further comprising a second rear fanning strip positioned within the interior of the housing, wherein the cable retainers of the first rear fanning strip face in an opposite direction to the cable retainers of the second rear fanning strip.

5. The connector module of claim 2, wherein the rear fanning strip includes a one-piece molded plastic body including the base and the cable retainers.

6. The connector module of claim 3, wherein the front fanning strip includes a one-piece molded plastic body including the base and the cable retainers.

7. A cable management fanning tree comprising:

an elongated base extending in a linear direction defining a longitudinal axis;

a plurality of cable retainers extending from opposite sides of the base, each cable retainer including:

a first finger portion and a second finger portion;

the first finger portion including an extension extending outwardly from the base, the extension terminating in a tip, the extension including a blocking tab spaced from an end of the tip, the first finger portion bendable relative to the base;

the second finger portion including an extension extending outwardly from the base at a location spaced from the first finger portion and extending toward the extension of the first finger portion, the extension of the spaced finger portion terminating in an inner projecting tab extending toward the base, the inner projecting tab positioned between the blocking tab and the base; wherein the first finger portion is bendable relative to the second finger portion by applying a force to the tip in a direction away from the second finger portion, thereby allowing cable access to an area bounded by the first and second finger portions.

* * * * *